United States Patent Office 3,137,171
Patented June 16, 1964

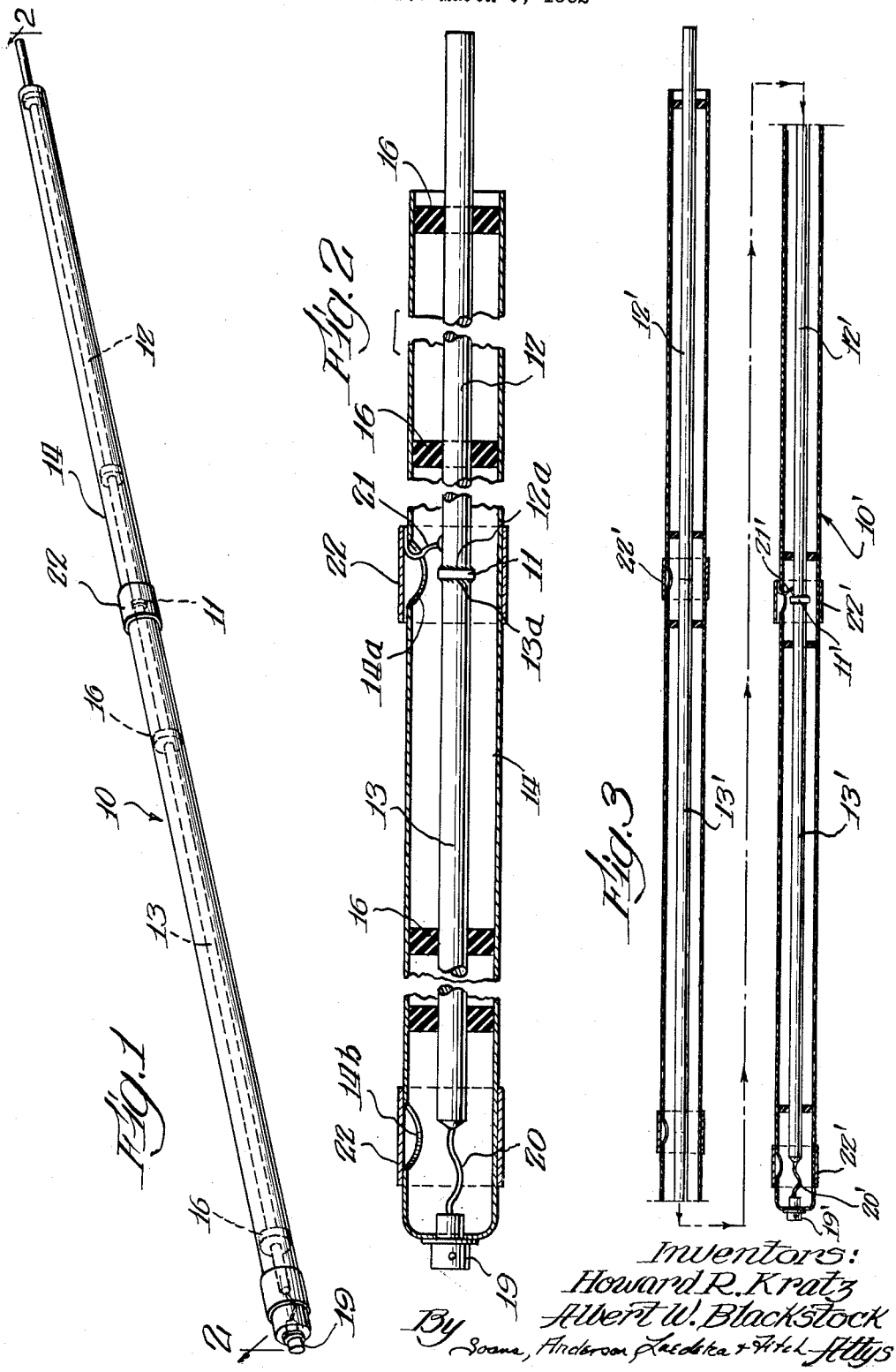

3,137,171
PRESSURE TRANSDUCER
Howard R. Kratz, San Diego, and Albert W. Blackstock, Cardiff, Calif., assignors to General Dynamics Corporation, New York, N.Y., a corporation of Delaware
Filed Mar. 6, 1962, Ser. No. 177,891
5 Claims. (Cl. 73—398)

This invention relates to pressure transducers and more particularly to pressure gauges which incorporate piezoelectric elements to effect the measurement of pressure pulses having magnitudes in excess of one kilobar.

To satisfy the need for pressure gauges which are capable of effecting highly accurate pressure measurements when rapid pressure changes are encountered, e.g., in plasma jets generated by high explosive charges, various piezoelectric gauges have been developed which rely on the so-called "pressure bar method" of measurement. That is, transducers have been developed wherein a pair of acoustic transmission bars are joined through the medium of a crystal. Pressure pulses striking the end of one of the bars are transmitted through the crystal thereby effecting the generation of a potential difference thereacross. One such device is disclosed in the copending application of the common assignee, Serial No. 830,920, which was filed on July 31, 1959, now Patent No. 3,029,643.

Generally, these previously developed devices cannot be satisfactorily utilized when the pressure pulses encountered exceed one kilobar in magnitude. This limitation exists because, when higher pressures are encountered, quartz crystals incorporated in these structures tend to fracture or, in the alternative, the elastic limit of one or both of the pressure bars utilized in the device is exceeded.

Accordingly, it is a prime object of the present invention to provide a pressure transducer which is capable of effecting measurements of pressures having magnitudes in excess of one kilobar.

A further object of the present invention is to provide a transducer which is constructed so that the individual structural components thereof are not adversely affected by the high pressure pulses encountered during the course of high pressure measurements.

An additional object of the present invention resides in the provession of a piezoelectric pressure gauge which is constructed so that accurate measurements of individual pressure pulses can be confirmed due to the monitoring of both the initial pulse transmitted to the piezoelectric element and successive resultant reflected pulses in the gauge.

Other objects and advantages of the present invention will become apparent from the following detailed description when considered in conjunction with the accompanying drawings, wherein:

FIGURE 1 is a perspective view of a piezoelectric pressure transducer of the type contemplated by the present invention;

FIGURE 2 is a cross sectional view taken along the line 2—2 in FIGURE 1; and

FIGURE 3 is a cross sectional view illustrating an alternate embodiment of the pressure transducer contemplated by the present invention.

In general, the present invention contemplates the provision of a piezoelectric transducer which is capable of effecting accurate measurements of pressure pulses having magnitudes in excess of one kilobar. A preferred embodiment of the transducer includes a pair of elongated coaxial pressure bars which have substantially dissimilar values of characteristic acoustic impedance and are joined through the medium of a piezoelectric wafer. The wafer is situated between adjacent ends of the pressure bars with the faces thereof extending generally perpendicular to the axis of the pressure bars. Suitable sensing and/or recording means are provided for monitoring an electric signal that is generated by the piezoelectric wafer as a result of the impingement of a pressure pulse on the end of the bar having the higher characteristic impedance, which pressure pulse results in a compressional wave being transmitted through the wafer. The ratio of the characteristic impedances of the pressure bars is selected so that the magnitude of the compressional wave transmitted through the piezoelectric wafer is reduced to a value that will not having a harmful effect on the crystalline structure.

Referring in particular to FIGURE 1, there is disclosed a preferred embodiment of a pressure transducer 10 contemplated by the present invention. As illustrated, the pressure transducer 10 includes a sensitive element 11 which is secured to and between the end faces of a pair of coaxial pressure or acoustic transmission bars or rods 12 and 13. The acoustic bars preferably are made of conductive material, having a high elastic limit. The bar exposed to the pressure pulses is also preferably fabricated of a high temperature material. The sensitive element and the acoustic transmission bars are housed within a tubular metallic shield 14 which extends along the length of the transducer.

As shown in FIGURE 2, the sensitive element 11 and transmission bars 12 and 13 are mounted in coaxial relation within the tubular electromagnetic shield 14, which is composed of conductive material such as brass or copper, by a plurality of insulating grommets 16. Preferably, the grommets 16 are fabricated from a material such as rubber and serve to electrically insulate and acoustically isolate the bars 12 and 13 and the sensitive element 11 from the shield 14.

The sensitive element 11, which is preferably a thin piezoelectric wafer of a material such as tourmaline, barium titanate, lead zirconate-titanate, quartz, etc., designed for thickness mode of vibration, is suitably joined to complementing inner conductive faces 12a and 13a of the pressure or acoustic transmission bars 12 and 13. Since a piezoelectric or crystal wafer resonates at a frequency dependent upon the thickness thereof, the crystal wafer is preferably made sufficiently thin to place the resonant frequency well above the maximum frequency of the pressure pulse. For example, when measuring pressure pulses corresponding to a frequency of 100 kc./sec. the thickness of the wafer should be less than approximately $\frac{1}{16}$ of an inch for quartz wafers. In this way a linear frequency response can be obtained for any pressure pulse, the maximum frequency of which is below the resonant frequency of the wafer.

Preferably, the joining of the crystal to the faces of the transmission bars is effected through the use of bonding material such as epoxy resin. To insure good electric coupling between the conductive end faces of the bars 12 and 13 and the oppositely disposed flat faces of the piezoelectric wafer 11, the pressure bars and sensitive element are joined as a unit prior to their being disposed within the shield 14. In this connection, during the fabrication of the transducer, the conductive end faces of the bars 12 and 13 are maintained in close proximity with the opposite faces of the piezoelectric wafer 11, and the epoxy resin or other bonding material is then disposed over the common area between the faces of the bars and the wafer.

In a preferred embodiment of the invention, the free end of the acoustic transmission bar 12 extends beyond the shield and is exposed to an environment wherein the high pressure pulse is encountered. More particularly, the end portion of the pressure bar 12 passes outwardly from the shield through one of the grommets 16.

When a pressure pulse is imparted to the outwardly extending end portion of the pressure bar 12 (i.e., substantially in excess of one kilobar) a compressional wave passes through the bar 12 and is transmitted, as previously described, through the piezoelectric wafer 11 to the pressure bar 13. The mechanical deformation of the crystal wafer 11 resulting from the transmission of the compressional wave therethrough results in the development of charges of opposite polarity on the oppositely disposed faces of the wafer that are maintained in electrical contact with the ends of the bars 12 and 13.

The potential developed across the piezoelectric wafer 11 is measured by a suitable recording device such as a cathode ray oscilloscope or oscillograph (not shown) after suitable calibration. Calibration of the transducer is accomplished by the so-called "ballistic method." Briefly, the calibration is carried out by suspending the joined pressure bars and wafer as a ballistic pendulum and exerting an impulse on the sensing end of the gauge by the impact of a steel or tungsten ball, which is also suspended as a pendulum. A slide projector displays a magnified image of the first part of the pressure bar, or tungsten rod on a scale mounted on a wall some distance away. The ballistic swing of the gauge and the voltage developed across the piezoelectric wafer and appearing on an oscilloscope which is suitably connected thereto, are photographed simultaneously. The oscilloscope is triggered by the discharge of a capacitor in the oscilloscope trigger circuit when the ball makes contact with the sensing end of the gauge. The information gained from these observed results is utilized to analytically establish a calibrating relationship between the pressure and voltage output of the gauge.

The recording device is coupled to a coaxial cable connector 19 that is suitably mounted in an end wall of the housing. In this connection, the pressure bar 12 is grounded to the shield 14 by a conductor 21 which extends from the surface of the pressure bar to the shield 14. Similarly, the free end of the pressure bar 13 is joined to an inner connection of the coaxial cable connector 19 through a conductor 20 to complete the electrical circuit.

As shown, the shield 14 has a pair of apertures 14a and 14b provided in the cylindrical wall thereof adjacent the junction of the pressure bars and wafer 11 and adjacent the junction of the conductor 20 and the end of the pressure bar 13. These apertures or access holes are utilized during the fabrication or servicing of the transducer to allow inspection and joining of the conductors 20 and 21 to the pressure bars 13 and 12, respectively, as by soldering or the like. The apertures 14a and 14b are covered by suitable cylindrical sleeves 22 that are mounted about and secured to the outer wall of the shield.

The tubular shield 14 not only serves to complete the required electrical path for the potential developed across the piezoelectric wafer 11 but also serves to insulate the unitary transducing element against shock due to lateral pressure and further minimizes the possibility of distortion of the compressional wave imparted to the pressure bar 12. In addition, the shield 14 minimizes the possibility of pick-up from stray magnetic and electric fields which might otherwise adversely influence the accuracy of the measurements effected by the transducer.

When utilizing the transducer 10 to effect pressure measurements in the pressure range above one kilobar, a pressure pulse striking the end of the pressure bar 12 will induce a longitudinal compressional wave therein. A portion of the compressional wave induced in the pressure bar 12 is transmitted to and through the piezoelectric wafer 11 and finally to the transmission bar 13. As a consequence, a potential is developed across the faces of the wafer 11 that is directly proportional to the magnitude of the compressional wave passing therethrough.

When the two bars are selected to have dissimilar acoustic characteristics, the magnitude of the compressional wave that is transmitted to the second bar is equal to the magnitude of the pressure pulse imparted to the first bar times a transmission factor (T) where:

$$T = \frac{2r}{r+1}$$

$r$ = the ratio of the characteristic impedance of the second bar to the characteristic impedance of the first bar.

As is well known, the characteristic acoustic impedance of a material can be expressed as:

$$Z = \rho V$$

where $\rho$ = the density of material in gm./cm.$^3$
$V$ = the velocity of longitudinal waves induced in the material in cm/sec.

In one convenient pressure gauge made for measuring pressure pulses having magnitudes in the range between about one and five kilobars, the transmission bars 12 and 13 were chosen so that the ratio of characteristic impedance (percentage of impedance mismatch) was such that a maximum transmission factor (T) of approximately .25 was realized. However, the magnitude of the transmission factor (T) and, accordingly, the choice of materials utilized so that neither the transmission bars nor the sensitive element will be harmfully affected will ultimately be dictated by the anticipated magnitude of the pressure pulse to be measured.

To achieve a transmission factor of approximately .25, the transmission bar 12 is preferably made of tungsten and the bar 13 is made of aluminum or magnesium. Tungsten is extremely suitable for use as the transmission bar which is exposed to the environment wherein pressure measurements are to be made due to its compatibility with the high temperatures that will normally be encountered therein, e.g., in plasma jets generated by high explosive charges. Moreover, tungsten is characterized by a high elastic limit which will not be exceeded as a result of the passage of compressional waves therethrough which correspond to the high pressure pulses which will normally be monitored by the transducer structure contemplated by the present invention. When the tungsten and aluminum are utilized in the two element configuration, the transmission factor (T) is .275. If magnesium is used as the low characteristic impedance element, a transmission factor (T) of .18 can be realized.

The portion of the compressional wave not transmitted to and through the wafer 11 is reflected. The reflected and transmitted components of the compressional wave when reaching the free ends of the bars 12 and 13, respectively, will be reflected with a corresponding phase reversal and will again be transmitted to the piezoelectric wafer 11.

In the illustrated embodiment, the lengths of the transmission bars 12 and 13 are chosen so that the portions of a pressure pulse which are transmitted and reflected from the piezoelectric crystal take the same length of time to then pass to the free ends of the transmission bars and back again to the piezoelectric crystal. The resultant mechanical force imparted to the wafer by these reflected waves will effect the production of a second potential difference across the wafer faces. This second potential difference will be substantially equal in magnitude to that initially developed across the wafer but opposite in phase (any losses in the bars will be minimal). This second or verifying potential difference will be developed across the wafer 11 after a delay equal to twice the time interval required for the passage of either the reflected wave through the rod 12 or the transmission wave through the rod 13.

FIGURE 3 shows an alternate embodiment of the transducer structure illustrated in FIGURE 2. The basic structural elements previously described (hereinafter designated by like, but primed numerals) are utilized in a similar manner in the structure illustrated in FIGURE 3. However, higher magnitude pressure pulses can be measured by this latter structure, without adversely affecting the individual components thereof.

As shown, the transducer consists of a plurality of alternate transmission sections 12′ and 13′. In this embodiment the rods are also preferably fabricated of tungsten and aluminum, respectively, and are formed in lengths such that compressional waves passing through each of the rods is delayed by the same time interval. Only a single sensitive element or piezoelectric wafer 11′ is used which is situated between the conductive faces of the last two transmission bars forming the transducer structure and is suitably joined thereto in the manner described in conjunction with the prior embodiment. The transmission bars which form the other sections of the transducer structure are joined in positive abutting relation by a suitable bonding material so that a complete path for compressional waves induced in the transducer structure is provided therein.

As seen in FIGURE 3, the transmission bar 12′ that forms the third of the four sections of the illustrated transducer is grounded by a suitable conductor 21′, and the end of the fourth transmission element 13′ is electrically connected through a conductor 20′ to a coaxial connector 19′. Accordingly, a potential difference developed across the wafer 11′ upon passage of a compressional wave therethrough can be measured as set forth in conjunction with the embodiment illustrated in FIGURE 2.

The primary distinction between the two transducer structures illustrated in FIGURES 2 and 3 resides in the fact that the four element structure of FIGURE 3 effects a greater attenuation of the compressional wave induced in the first transmission bar 12′ than is realized with the two element structure constructed of the same material. In this connection, the wave in passing from the first to the second bar is transmitted by a transmission factor less than one, which represents a physical attenuation. The attenuated wave is in turn transmitted to the third bar by a transmission factor greater than one and then through the crystal to the fourth bar by a transmission factor less than one.

The magnitudes of the transmission factors realized with the four element structure will best be understood from a consideration of a specific example which is based on the assumption that a compressional wave having a magnitude of one is induced in the first of the transmission bars. A transmission factor of .293 will be realized at the first interface between the tungsten and aluminum rods forming the first two elements of the four element structure and the wave will be accordingly attenuated. At the second interface between the aluminum and tungsten rods which constitute the second and third elements of the transducer, a transmission factor of 1.71 will be realized. The same transmission factor (T) that is realized at the first interface, namely, .293 is also obtained at the third interface so that the wave passing through the crystal is further attenuated. Accordingly, the magnitude of the pressure pulse passing through the second bar will be .293 while the magnitude of the pulse passing through the third and fourth bars will be .500 and .147 respectively. Consequently, a four element pressure gauge formed of alternate sections of tungsten and aluminum reduces the magnitude of the initial compression wave to a valve equal to approximately ½ the value realized with the two element tungsten and aluminum structure.

In the four element transducer structure, an intrinsic verification of the magnitude of the potential difference initially developed across the wafer 11′ can be realized if the lengths of the transmission bars 12′ and 13′ are properly chosen. In this connection, various transmitted and reflected components of the initial compressional wave will strike the piezo-electric wafer 11′ after elapsed time intervals of twice, four times and six times the time ($t$) it takes for the compressional wave to pass through one of the bars (the initial pulse is applied to the crystal at $t=0$). The waves arriving at the crystal at $2t$ and $4t$ will be cancelled if the ratio of the acoustic impedances of the two materials is chosen to be 0.1715. However, the components of the initial compressional wave striking the wafer 11′ after a time delay equal to six times the time interval required for the wave to pass through one of the transmission bars, will develop a potential difference across the wafer substantially equal in magnitude (any losses in the bars will be minimal) but opposite in phase to the initially developed potential difference. An advantage yielded by the four element structure illustrated in FIGURE 3 is that if a particular time delay is desired between the development of the initial potential difference and the verifying resultant potential difference the length of the transducer illustrated of FIGURE 3 need only be two-thirds the length of the two element transducer structure.

A specific embodiment of the transducer structures disclosed in FIGURES 2 or 3 incorporates a quartz crystal having a diameter of 5/16″ and a thickness of 1/16″. Pressure or acoustic transmission bars are utilized in the from of rods having a diameter of ¼″. In the two element gauge a tungsten bar 24″ long and an aluminum bar 26¾″ long are utilized yielding a time delay of 260$\mu$ seconds between the initial pulse and the reflected signal "confirming" pulse. In the four element gauge each of the two tungsten rods is 8″ long and each aluminum rod is 9″ long, which lengths again yield a time delay of 260$\mu$ seconds. The overall length of the unit runs to approximately 51 inches or 34 inches, depending upon whether a two element or a four element construction is utilized. A brass cylindrical shield having an outside diameter of ¾ of an inch is utilized as the housing for the transducer.

From the foregoing, it is apparent that a pressure transducer constructed in accordance with the present invention provides a means whereby high pressure pulses in excess of one kilobar can be measured. In this connection, pressure pulses having magnitudes substantially in excess of one kilobar can be monitored without adversely affecting the structural characteristics of the components utilized in the transducer.

It should be understood that various modifications in the structural configuration of the embodiments previously described can be effected by one skilled in the art without deviating from the invention as set forth in the following claims.

What is claimed is:

1. A transducer for accurately effecting high pressure measurements which transducer comprises a sensitive element having a pair of substantially flat parallel faces cut perpendicularly to a selected axis thereof, said sensitive element being responsive to compressional waves transmitted thereto, a pair of coaxial acoustic transmission bars having substantially dissimilar values of characteristic acoustic impedance joined to the opposite faces of said sensitive element, a conductive shield for said joined transmission bars and sensitive element, and means mounting said joined transmission bars and sensitive element within said shield so that a portion of one of said bars extends outwardly therefrom, said transmission bar with the portion thereof extending from said shield being formed of tungsten and the other of said transmission bars being formed of a material from the class consisting of aluminum and magnesium.

2. A transducer for accurately effecting high pressure measurements in excess of one kilobar, which transducer comprises a piezoelectric crystal having a pair of substantially flat parallel faces cut perpendicularly to a selected axis thereof, a pair of coaxial acoustic transmission bars having substantially dissimilar values of characteristic acoustic impedance joined to the opposite faces of said piezoelectric crystal, a conductive shield for said joined transmission bars and piezoelectric crystal, and means mounting said joined transmission bars and piezoelectric crystal within said shield so that a portion of one of said bars extends outwardly therefrom, said bar with the portion thereof extending from said shield transmitting compressional waves to said crystal in response to impingement of pressure waves on the protruding end thereof and having a value of characteristic acoustic impedance which is sufficiently greater than the value of characteristic acoustic impedance of the other of said bars that the compressional wave transmitted through said crystal is reduced to a value less than that which damages said crystal.

3. A transducer for accurately effecting high pressure measurements in excess of one kilobar, which transducer comprises at least two coaxially aligned bars for transmitting compressional waves induced in one of said bars by the incidence of a pressure pulse thereon, a piezoelectric crystal situated between and joined in abutting relation to said transmission bars, an elongated tubular conductive shield for said joined transmission bars and piezoelectric crystal, means mounting said joined transmission bars and piezoelectric crystal within said conductive shield so that a portion of one of said bars extends outwardly from one longitudinal extremity thereof, a pair of electrical output terminals mounted within and extending from the other longitudinal extremity of said shield and adapted to be joined to external measuring instrumentalities, and means electrically connecting said output terminals across said piezoelectric crystal so that a potential difference established thereacross as a result of the passage of compressional waves therethrough is supplied to said output terminals, said transmission bar with the portion thereof extending from said shield transmitting compressional waves to said crystal in response to impingement of pressure waves on the protruding end thereof, being formed of a high temperature material and having a value of characteristic acoustic impedance sufficiently greater than the value of characteristic acoustic impedance of the other of said bars that the pressure wave transmitted through said crystal is reduced to a value less than that which damages said crystal.

4. A transducer for accurately effecting high pressure measurements in excess of one kilobar, which transducer comprises at least two coaxially aligned bars for transmitting compressional waves induced in one of said bars by the incidence of a pressure pulse thereon, a piezoelectric crystal situated between and joined in abutting relation to said transmission bars, an elongated tubular conductive shield for said joined transmission bars and piezoelectric crystal, means mounting said joined transmission bars and piezoelectric crystal within said conductive shield so that a portion of one of said bars extends outwardly from one longitudinal extremity thereof, a pair of electrical output terminals mounted within and extending from the other longitudinal extremity of said shield and adapted to be joined to external measuring instrumentalities, and means electrically connecting said output terminals across said piezoelectric crystal so that a potential difference established thereacross as a result of the passage of compressional waves therethrough is supplied to said output terminals, said transmission bar with the portion thereof extending from said shield being formed of tungsten and the other of said transmission bars being formed of a material from the class consisting of aluminum and magnesium.

5. A transducer for accurately effecting high pressure measurements in the range of between approximately one and seven kilobars, which transducer comprises a piezoelectric wafer crystal, a first acoustic transmission bar having one end thereof joined to one face of said piezoelectric crystal, a second acoustic transmission bar coaxially aligned with said first transmission bar and joined at one end to the other face of said piezoelectric crystal, at least two aligned and joined acoustic transmissions bars secured in abutting relation to the other end of said second transmission bar, an elongated tubular conductive shield for said joined transmission bars and piezoelectric crystal, means mounting said joined transmission bars and piezoelectric crystal within said conductive shield so that the end of the outer one of said bars that are secured to said second transmission bar extends outwardly from one longitudinal extremity of said shield, a pair of electrical output terminals mounted within and extending from the other longitudinal extremity of said shield adjacent the face end of said first transmission bar, and means electrically connecting said output terminal to said first and second transmission bars and across said piezoelectric crystal, said transmission bar which extends from one longitudinal extremity of said shield and said second transmission bar being formed of tungsten, said first transmission bar and said transmission bar secured to said second transmission bar being formed of aluminum.

References Cited in the file of this patent
UNITED STATES PATENTS
3,029,643    Stern _____ Apr. 17, 1962